Feb. 17, 1970

G. BALCKE ET AL 3,496,394

COMBINED VOLTAGE REGULATOR-BRUSH HOLDER UNIT FOR AUTOMOTIVE
TYPE ALTERNATOR

Filed Dec. 26, 1968

INVENTORS
Gerhard BALCKE
Hans REICHELT

BY
their ATTORNEYS

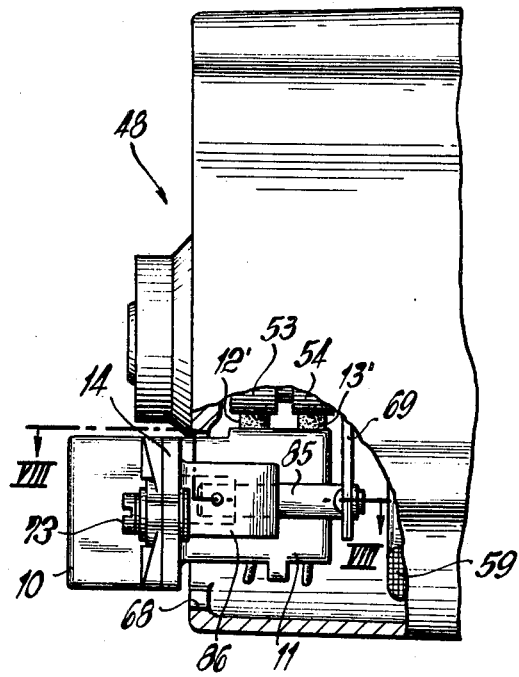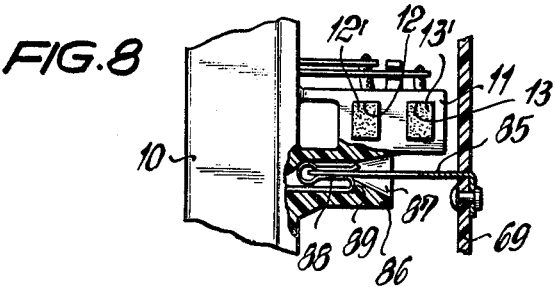

United States Patent Office 3,496,394
Patented Feb. 17, 1970

3,496,394
COMBINED VOLTAGE REGULATOR-BRUSH
HOLDER UNIT FOR AUTOMOTIVE TYPE
ALTERNATOR
Gerhard Balcke, Neustadt, and Hans Reichelt, Stuttgart, Germany, assignors to Robert Bosch G.m.b.H., Stuttgart, Germany, a limited liability company of Germany
Filed Dec. 26, 1968, Ser. No. 786,920
Claims priority, application Germany, Feb. 10, 1968, 1,613,984
Int. Cl. H02k 11/00
U.S. Cl. 310—68
14 Claims

ABSTRACT OF THE DISCLOSURE

A brush holder section is molded on a voltage regulator section to extend substantially perpendicularly therefrom. The voltage regulator section being formed with holes, one of which can serve as a combined attachment unit to the end bell of an alternator, and electrical connection simultaneously, to hold the voltage regulator and brush holder assembly as a unit in the alternator, and provide a closure for part of the end bell.

---

The present invention relates to a combined voltage regulator-brush holder unit for automotive type alternators, and more particularly for such a combination unit which can be assembled as part of an alternator housing, for example the end bell, for rapid connection and ease of replacement, while providing a sealed, integral unit not subject to damage from dirt, contamination, or vibration.

It has previously been proposed (see Austrian Patent 246,275, assigned to the assignee of the present invention) to unite brush holders and voltage regulators into one single unit. The known construction required, however, a fair amount of space and additionally required different constructions for different sizes of generators.

It is an object of the present invention to provide a combined brush holder-voltage regulator unit which is easy to manufacture, can be used as a single unit with various sizes of generators thus simplifying mass production, and has improved performance characteristics.

Subject matter of the present invention

Briefly, a generally box-like housing structure, having one open side, encloses the voltage regulator circuit components which consist exclusively of non-moving parts; the brush holder structure extends, in the form of a projection, from an integral plate which forms one side of the box-like structure to close it off, so that a generally T shaped unit results, the box-like structure containing the voltage regulator elements being enclosed in the cross-part of the T, and the brush holder projecting therefrom. The box-like structure may be formed with attachment wings, to which also terminals may be brought out, for securing the entire assembly against an end bell of an alternator, the projecting portion of the T, that is the brush holder section, projecting inwardly towards the shaft of the machine to retain the brushes which supply current to the field of the alternator.

Only the brush holder section of the assembly need extend into the alternator housing. The regulator section itself may be so located that it is outside of the housing, or fitted into an opening therein, where it can be cooled easily and attached to the bell of the alternator independently of the type of generator used. The entire structure can be one integral molding, the voltage regulator section itself being completely encapsulated with all terminals extending out of the box-like structure in the direction of the brushes, that is towards the interior of the generator for connection of electrical conductors thereto. The box-like structure itself is the form for the encapsulating material, and does not require any additional openings therein which may have to be sealed to prevent escape of the encapsulating material, when the encapsulating material is cast around the electronic components. Thus, the entire unit can be made free of bubbles or blow holes, without waste and without additional mold elements.

The invention will now be described by way of example with reference to the accompanying drawings, wherein:

FIG. 5 is a circuit diagram of the regulator and alternator combination;

FIG. 6 is a partial side view of the alternator, partly broken away, illustrating a different embodiment of connection of the regulator-brush assembly to the alternator circuit;

FIG. 7 is a view similar to FIG. 6, illustrating yet another embodiment; and

FIG. 8 is a cross-sectional view taken along lines VIII—VIII on FIG. 7.

Figure 1:
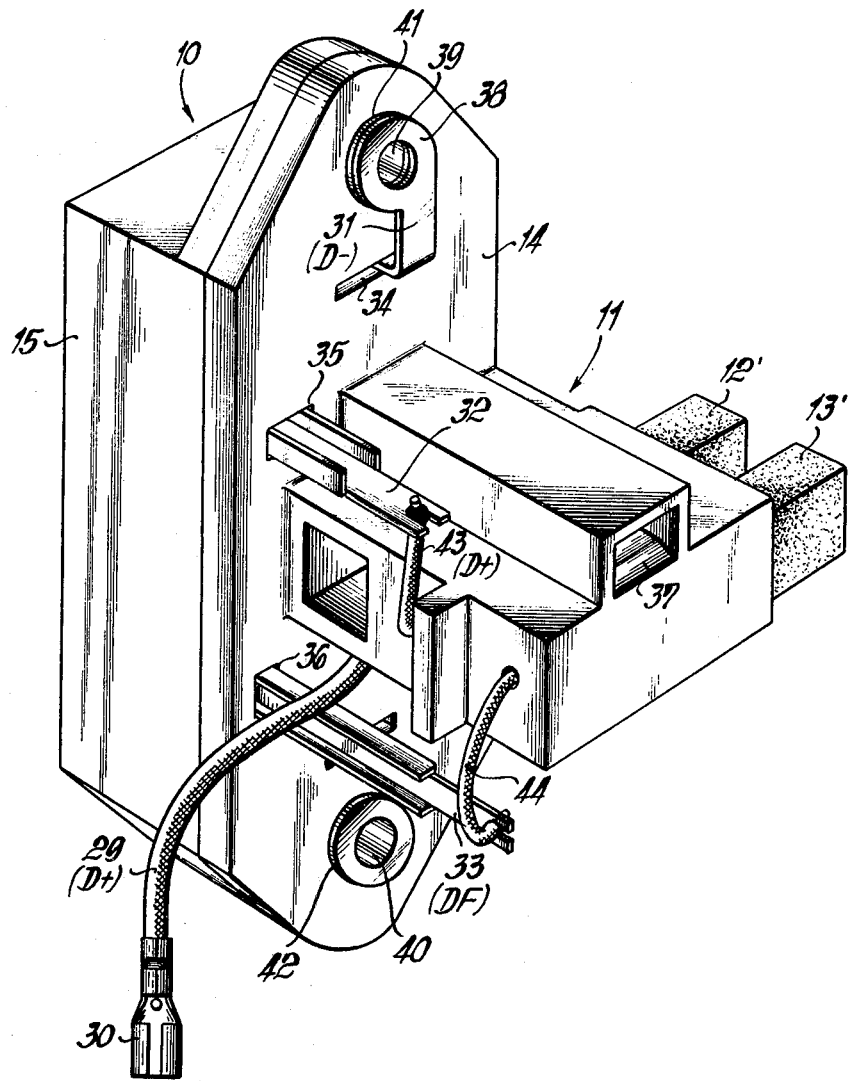
FIG. 1 is a perspective, assembled view of a brush holder and a voltage regulator, as one unitary assembly.

The brush holder-regulator combination has two sections—a regulator section 10 and a brush holder section 11. Each is a molding of plastic material. The brush holder section 11 has a pair of guide holes 12, 13, (FIG. 8) to guide brushes 12', 13' to carry current to the exciter winding of the alternator. The brush holder terminates in a plate 14, to form an attachment support therefor. The regulator section 10 is a box-like elongated structure 15, providing a chamber 16 in which the electrical components of the voltage regulator are located. The box-like structure 15 is closed by plate 14, so that chamber 16 is closed off.

Figure 2:
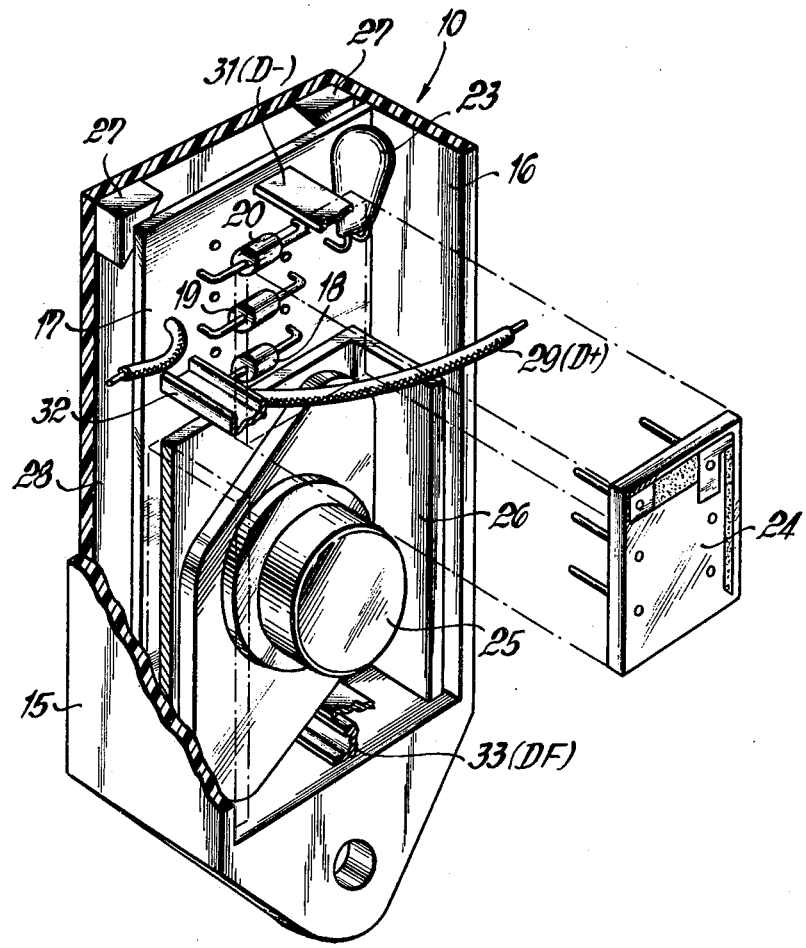
FIG. 2 is a rear view of the regulator, with the housing partly broken away, and partly in exploded representation.

As best seen in FIG. 2, the electrical components of the voltage regulator 10 are secured to a plate 17 of insulating material. The reverse side of plate 17, not seen in FIG. 2, carries a printed circuit to interconnect the electrical components of the voltage regulator which includes three diodes 18, 19, 20, a condenser 23, as well as a resistance plate or element 24. Resistance 24 has six connecting pins which can be soldered in six corresponding holes in the plate 17.

Further semi-conductor elements are jointly located in a transistor housing 25 which is secured to a heat sink 26, in generally U-cross sectional shape. The connections from the semi-conductor elements within transistor housing 25 are likewise soldered to the printed circuit on plate 17. Plate 17 itself is spaced from the bottom 28 within chamber 16 by four spacers 27.

The alternator, the circuit of which is schematically seen in FIG. 5, is connected to the regulator over a conductor 29, having a female connector 30 attached thereto, the other end of conductor 29 being interconnected with plate 17. Further, three connecting lugs 31, 32, 33 extend from chamber 16 and through three corresponding openings 34, 35, 36 of plate 14. Lug 32 is electrically further connected to female plug 37, formed as an integrated unit of the brush holder section 11.

Connecting lug 31 is bent-over at right angles at the edge of opening 34, and formed at its end with an eyelet 38, the central opening of which is in alignment with an opening 39 in the terminal portion of the assembly. The other end of assembly 10 has a similar opening 40 which, similar to opening 39, matches an opening in plate 14.

A metallic eyelet 41 is inserted in opening 39; an eyelet 42 is inserted in opening 40, the eyelets interconnecting plate 14 and the terminal portions of the box-like structure 15. Screws, such as screws 72 and 73 (FIGS. 3 and 4) then can interconnect both mechanically as well as electrically the entire assembly with the end bell of the alternator, eyelet 41 being pressed against the eyelet 38 in terminal lug 31 to simultaneously provide a good electrical connection between lug 31 and generator housing 61, as indicated in FIG. 6.

Terminal lug 32 is interconnected by means of a flexible wire 43, soldered thereto, with a brush 12', located in brush holder opening 12. The flexible wire, or brush pigtail 43 is so dimensioned that it will retain the brush within the brush holder guide opening, against the strength of the ordinary brush spring (not shown since it would be included within the brush guide of the molding), even when the entire assembly is removed out of the generator; thus the brush is securely held within the assembly even when removed therefrom, without separate parts or springs which introduce additional parts in the assembly and which have a tendency to get lost. Brush 13' is similarly connected by means of a flexible pigtail 44, both electrically, as well as mechanically, to terminal lug 33. Terminal lugs 32, 33, thus serve simultaneously to hold the brushes 12', 13' within the brush holder section 11, while providing the necessary electrical connection.

After assembly of the electrical elements in chamber 16, a liquid resin is poured thereinto to encapsulate the electrical components. Transistor housing 25 protects the parts therein against mechanical stresses arising within the encapsulating compound, and against possible damage resulting therefrom. After encapsulating the electrical elements, plate 14 is secured to the open side of the box-like structure 15, the terminal lugs extending through openings 34, 35, 36. Lug 31 is bent over and pigtails 43, 44 are soldered to lugs 32, 33 as shown. The resulting assembly, as best seen in FIG. 1, generally will be T shaped and very compact.

Figure 3:
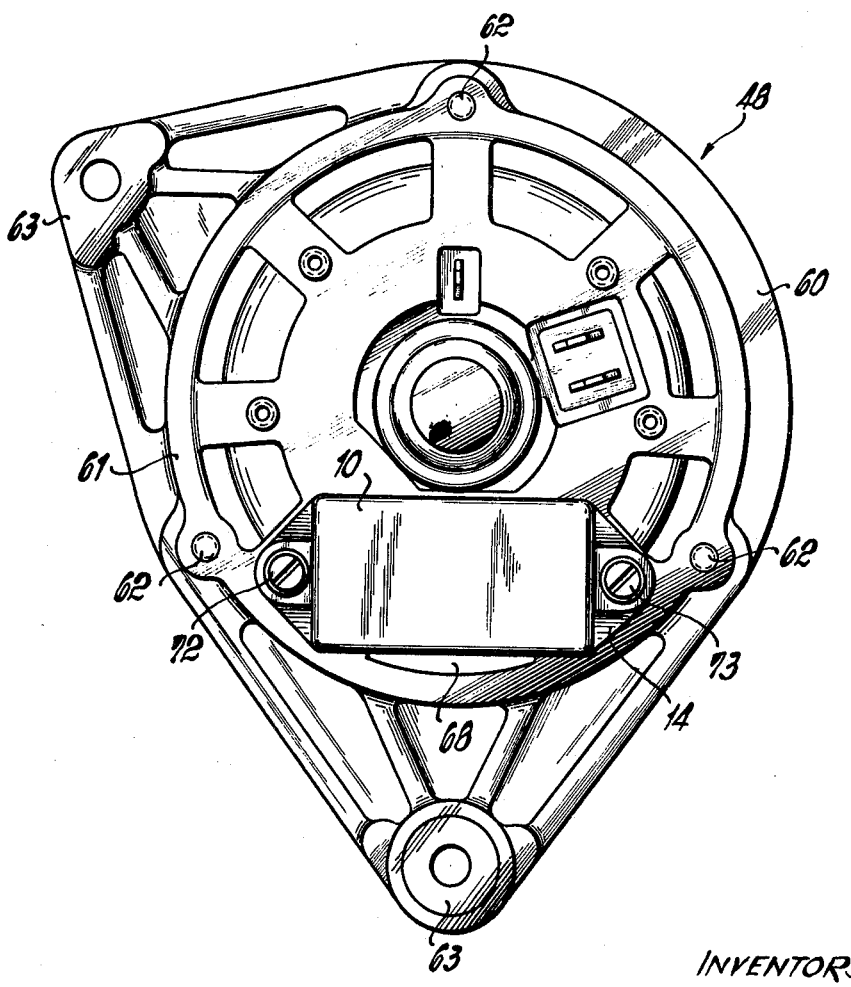
FIG. 3 is an end view of an alternator with the regulator-brush holder in position on the end bell.
Figure 4:
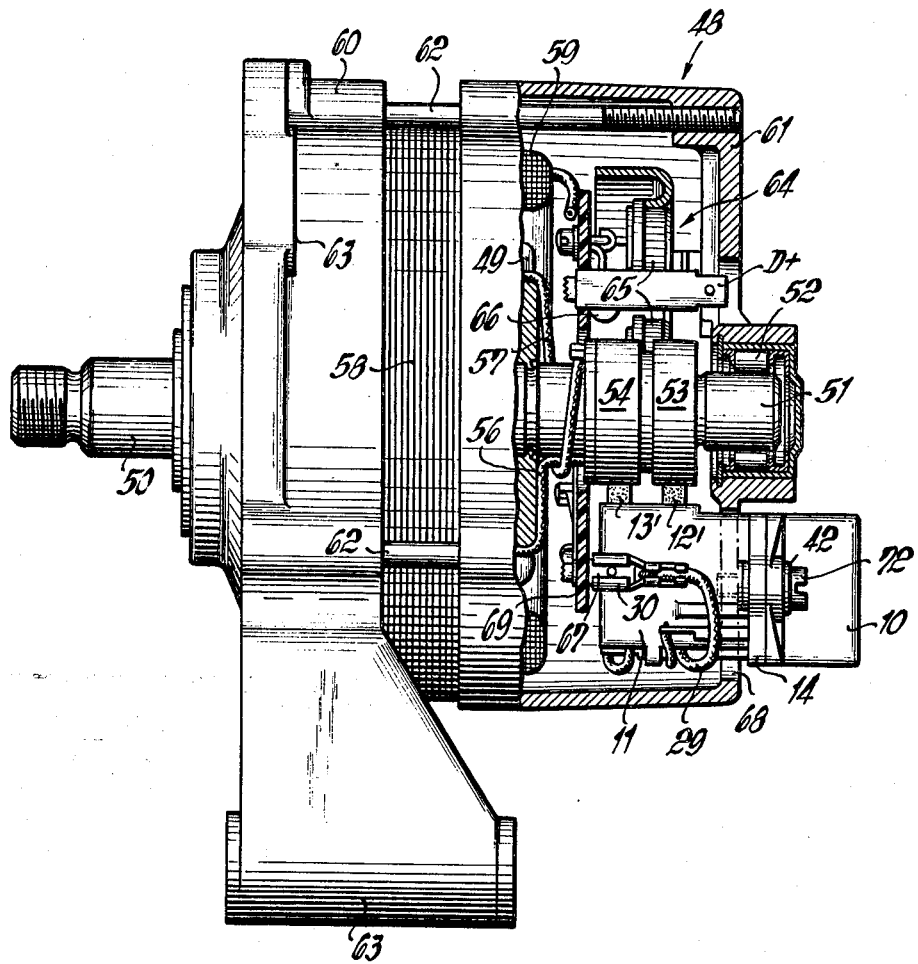
FIG. 4 is a side view of the alternator, partly broken away, and in longitudinal section.

Assembly of the completed unit into an alternator 48 is best seen in FIGS 3 and 4. Alternator 48 has a salient rotor 49 secured to a shaft 50 to be driven with variable speed, for example from an internal combustion engine. The end 51 of the shaft 50 which carries the slip rings is retained in a roller bearing 52; two slip rings 53, 54 supply current to field winding 55 on rotor 49 (see FIG. 5). A pair of connections 56, 57 (FIG. 4) interconnect the slip rings and winding 55. Line 57 is preferably wound about shaft 50 by about 200°, in order to compensate centrifugal forces by friction on shaft 50.

The armature includes laminations 58 and a three-phase winding 59, star connected, and secured between an end bell 60 adjacent the drive pulley, and a second end bell 61 adjacent the slip rings. The laminations 58 are secured between the end bells by means of screws 62.

A pair of attachment arms 63 are connected to the end bell at the drive side. The end bell 61 further retains a rectifier array 64 in order to rectify the 3φ current supplied by alternator 48. Nine diodes (see FIG. 5) are used; six diodes 65 are connected as a three-phase bridge rectifier to supply output power of the generator 48 to the load; additionally, three exciter diodes 66 are connected to the output of the alternator to supply the solid state voltage regulator 10 and through it the exciter winding 55. Two power rectifiers 65 and one exciter rectifier 66 can be seen in FIG. 4.

The cathodes of the three exciter rectifier diodes 66 are joined together and connected to terminal D+, as well as to a terminal lug 67 to which plug connector 32 is connected. Voltage regulator 10 is connected thus with current from generator 48. Lug 67 is secured to an insulating plate 69 which carries the electrical interconnections for diodes 65, 66. The structural element formed by regulator section 10 and brush holder section 11 is inserted in an opening 68 of end bell 61 at the slip ring side of the alternator, as best seen in FIGS. 3 and 4. Upon assembly of the structural unit to the alternator, the unit must be tilted as a whole in order to be able to introduce brushes 12 and 13 through opening 68. Thus, terminal 30 is first secured to lug 67, and then the unit formed of regulator section and brush holder 11 to which brushes 12' and 13' are secured (and held therein by the pigtails) is so introduced that brush 13' engages slip ring 54 and brush 12' engages slip ring 53. Thereafter, screws 72, 73 are introduced into openings 39, 40 and secured from the outside in tapped holes of the end bell 61, which also forms the electrical connection over eyelet 38 of lug 31 with the structure of the alternator, and thus with chassis 74 (FIG. 5) for the voltage regulator. Brush holder 11, as well as voltage regulator 10 are thus both mechanically as well as electrically completely connected.

Reverting again to FIG. 5, the outputs of the bridge rectifier 65 are connected to chassis on the one hand and on the other to a terminal connection B+. A battery 75, as well as other loads not illustrated may then be connected between B+ and chassis; such other loads may, for example, be the headlights of a vehicle.

Other arrangements for securing the structural unit 10, 11, to generator 48 can be devised, for example snap bails, or snap fastener connections in elastic holding straps or flaps. The arrangement can, of course, also be constructed to present the brushes parallel to the axis of shaft 50 for use with slip disks.

Different means of forming the electric contact between terminal D+ of generator 48 and the brush holder-regulator unit are seen in FIGS. 6 to 8. Parts which are alike those previously described have been given the same reference numerals and will not be described again.

Referring now to FIG. 6, insulating plate 69 has a U-shaped resilient contact element 79 riveted thereto, which is electrically connected with regulator section 10. It corresponds to the separable terminal lug-plug connection 67–30 and is connected with the terminal D+ of the generator 48. An L-shaped metallic part 80 is secured to the plate 14 of the brush holder section 11; a contact member 81 is riveted to the L-shaped element 80. Upon assembly of the unit formed of sections 10, 11 in the end bell of the generator 48, the rounded tip 82 of contact member 81 engages the U-shaped contact element 79 to compress element 79 with a predetermined contact pressure. Rounded tip 82, as well as the opposite portion of contact member 79 may be covered with a coating of a noble metal, for example silver, gold, or platinum, in order to obtain a good contact which does not degrade, even under long use. The arrangement according to FIG. 6 has the advantage that the connection is automatically established as soon as unit 10, 11 is assembled to the alternator housing. Since the unit 10, 11 must be tilted upon assembly in order to guide it through openings 68 of end bell 61, an ordinary plug-prong connection would not be suitable. The construction of the present invention enables ready replacement of the regulator-brush holder assembly 10, 11, as a unit, without re-plugging of electrical terminals, or re-connection of screw contacts of electrical wires.

FIGS. 7 and 8 illustrate a different embodiment in which the electrical connection from terminal D+ is over a knife blade contact. A flat prong 85 is riveted to plate 69 which extends up to the opening 68 of end bell 61. The brush holder section is widened at the side, as seen at 86 (FIG. 7), located at the side and parallel to brushes 12, 13. The widened part 86 is formed with an opening 87, in which an S-shaped contact spring 88 is secured by bearing against a shoulder 89. Spring 88 is electrically connected with voltage regulator section 10. As seen in FIG. 8, a pair of parallel arms of the S-shaped loop of the contact spring 88 are so arranged as to be biased against each other, so that the flat prong 85 will make good contact at both sides. The plane of the flat prong 85 is so chosen that the assembly of sections 10, 11 can carry out the necessary tilting movement when it is connected to end bell 61. This embodiment also automatically forms the electrical connection of the regulator to the terminal D+ over the knife blade wiping contacts 85–88, and the connection to chassis over eyelet and lug 31–38 upon mechanical connection of the unit 10, 11 to the end bell, without requiring any additional manufacturing or assembly steps.

The present invention has been illustrated in connection with a salient pole automative-type alternator; various structural changes and modifications, as determined by the requirements of particular applications or uses may be made without departing from the inventive concept.

What is claimed is:

1. Combined solid state voltage regulator and brush holder unit for assembly into an alternator having a rotating excited field comprising
   a generally box-like housing structure (10);
   a voltage regulator circuit including exclusively non-moving electric circuit elements located in and protected by said housing;
   and a generally T-shaped molded brush holder structure (11) having an integral plate (14) at one side thereof and forming the cross-element of the T and matching a side of said box-like structure thus forming a closure for the housing structure, and having a brush holder portion (11) formed by the depending leg of the T.

2. Assembly according to claim 1, wherein said electric circuit elements are encapsulated in said box-like structure (10); terminal lugs (31, 32, 33) are provided extending from said structure; and said brush holder structure is formed with openings therein matching the location of said terminal lugs to permit passage of said terminal lugs therethrough.

3. Assembly according to claim 1, in combination with an alternator unit, said alternator having an end bell (61);
   said end bell having an opening at least as large as the cross section of said brush holder structure to permit insertion of said brush holder structure therethrough, said voltage regulator-brush holder assembly being secured to said end bell with said brush holder structure extending inwardly of said end bell and said voltage regulator structure closing off said opening.

4. Assembly according to claim 3, including terminal means extending from said assembly, said terminal means all extending in the direction of the rotating structure of said alternator and away from said end bell.

5. Assembly according to claim 1, wherein said plate has a pair of extension legs extending beyond the outline of said box-shaped structure and being formed with means for attachment to said alternator housing.

6. Assembly according to claim 1, including flexible conductors adapted for interconnection to said electrical circuit elements with spring-pressed brushes in said brush holder mounted to project from said box-like housing, the conductors being formed to retain a brush, connected thereto, in position within the brush holder and against brush spring pressure.

7. Assembly according to claim 3, wherein said plate has a pair of extension legs extending beyond the outline of said box-shaped structure;
   attachment openings formed in said legs;
   an electrical terminal extending from said box-like structure into the region of said extension and being formed with a matching opening;
   and separate connections electrically and structurally interconnecting said electrical terminal and said box-like structure and said end bell.

8. Assembly according to claim 3, including separable, matching electrical interconnection means formed on said alternator and said voltage regulator-brush holder assembly, respectively, insulated from the end bell of said alternator.

9. Assembly according to claim 8, wherein a circuit board is provided mounted on said end bell; and said separable electrical connection means includes plug-receptacle means respectively located on said unit and said circuit board.

10. Assembly according to claim 9, wherein said plug-receptacle includes a knife blade and a resilient embracing contact member to provide a separable wiping contact, the plane of said knife blade contact being selected to permit tilting movement of said voltage regulator-brush holder assembly upon assembly of said unit into the end bell.

11. Assembly according to claim 8, wherein said separable electrical connections means includes a fixed contact member in one of said units and a resilient contact member in the other resiliently biased against said fixed contact member and deformed against said resilient bias when said assembly is assembled to said end bell.

12. The assembly of an automotive-type alternator having a rotor and an excited field; a slip ring structure on said rotor; an end bell rotatably retaining said slip ring structure; a printed circuit board in said end bell and located in a plane essentially transverse to the shaft of said rotor; and a rectifier circuit assembly including a solid state rectifier mounted on said printed circuit board;
   with a voltage regulator-brush holder unit comprising a molded box-like housing secured to said end bell; solid state electric circuit elements located in and protected by said housing;
   a molded brush holder structure extending generally transverse of said housing;
   and electrical connection means extending from said housing and electrically interconnecting said voltage regulator-brush holder unit, brushes within said brush holder unit, and said printed circuit board.

13. Assembly according to claim 12, wherein said end bell is formed with an opening therein of at least the size of said brush holder section, said box-like housing closing off said opening in said end bell after introduction of said brush holder section into said housing and engagement of the brushes with the slip rings of the rotor.

14. Assembly according to claim 12, wherein brushes having pigtails are located in said brush holder; said pigtails being connected to said electrical connection means and being dimensioned to prevent removal of said brushes from said brush holder to permit assembly of the brush holder together with said brushes, and said voltage regulator unit as one unitary assembly into the alternator.

References Cited

UNITED STATES PATENTS

| | | | |
|---|---|---|---|
| 3,078,409 | 2/1963 | Bertsche | 310—68.4 |
| 3,182,218 | 5/1965 | Videtic | 310—43 |
| 3,219,860 | 11/1965 | Redick | 310—247 |
| 3,267,312 | 8/1966 | Redick | 310—239 |
| 3,378,708 | 4/1968 | Baker | 310—68 |

MILTON O. HIRSHFIELD, Primary Examiner

R. SKUDY, Assistant Examiner

U.S. Cl. X.R.

310—239